US006828019B2

(12) United States Patent
Kong et al.

(10) Patent No.: US 6,828,019 B2
(45) Date of Patent: Dec. 7, 2004

(54) THERMOPLASTIC FILM

(75) Inventors: Dan-Cheng Kong, Fairport, NY (US); Michael Dale Cleckner, Rochester, NY (US)

(73) Assignee: ExxonMobil Oil Corporation, Irving, TX (US)

( * ) Notice: Subject to any disclaimer, the term of this patent is extended or adjusted under 35 U.S.C. 154(b) by 0 days.

(21) Appl. No.: 10/278,241

(22) Filed: Oct. 23, 2002

(65) Prior Publication Data

US 2003/0207138 A1 Nov. 6, 2003

Related U.S. Application Data

(63) Continuation-in-part of application No. 10/135,321, filed on May 1, 2002.

(51) Int. Cl.$^7$ ............................................. B23B 27/32
(52) U.S. Cl. ................... 428/354; 428/32.1; 428/32.38; 428/195.1; 428/515; 428/516; 428/520; 428/522; 428/523; 428/910
(58) Field of Search ................................. 428/520, 522, 428/523, 910, 515, 516, 354, 32.38, 32.1, 395.1

(56) References Cited

U.S. PATENT DOCUMENTS

| | | |
|---|---|---|
| 2,759,913 A | 8/1956 | Hulse |
| 3,753,769 A | 8/1973 | Steiner et al. |
| 4,194,039 A | 3/1980 | Mueller |
| 4,214,039 A | 7/1980 | Steiner et al. |
| 4,223,115 A | 9/1980 | Zalucha et al. |
| 4,308,189 A | 12/1981 | Moritani et al. |
| 4,333,968 A | 6/1982 | Nahmias |
| 4,377,616 A | 3/1983 | Ashcraft et al. |
| 4,386,129 A | 5/1983 | Jacoby |
| 4,421,823 A | 12/1983 | Theisen et al. |
| 4,439,493 A | 3/1984 | Hein et al. |
| 4,447,494 A | 5/1984 | Wagner, Jr. et al. |
| 4,546,140 A | 10/1985 | Shih |
| 4,572,854 A | 2/1986 | Dallmann et al. |
| 4,582,752 A | 4/1986 | Duncan |
| 4,610,914 A | 9/1986 | Newsome |
| 4,615,926 A | 10/1986 | Hsu et al. |
| 4,629,657 A | 12/1986 | Gulati et al. |
| 4,632,869 A | 12/1986 | Park |
| 4,652,489 A | 3/1987 | Crass |
| 4,677,017 A | 6/1987 | DeAntonis et al. |
| 4,704,314 A | 11/1987 | Hsu et al. |
| 4,716,061 A | 12/1987 | Winter |
| 4,755,419 A | 7/1988 | Shah |
| 4,758,462 A | 7/1988 | Park |
| 4,801,640 A | 1/1989 | Dallmann et al. |
| 4,828,928 A | 5/1989 | Shah |
| 4,853,602 A | 8/1989 | Hommes et al. |
| 4,865,908 A | 9/1989 | Liu et al. |
| 4,879,177 A | 11/1989 | Boice |
| 4,906,517 A | 3/1990 | Akao et al. |
| 4,927,689 A | 5/1990 | Markiewicz |
| 4,927,690 A | 5/1990 | Welsh |
| 4,938,683 A | 7/1990 | Boice |
| 4,946,743 A | 8/1990 | Winter |
| 4,961,992 A | 10/1990 | Balloni et al. |
| 4,975,469 A | 12/1990 | Jacoby et al. |
| 5,019,447 A | 5/1991 | Keller |
| 5,023,143 A | 6/1991 | Nelson |
| 5,057,177 A | 10/1991 | Balloni et al. |
| 5,064,716 A | 11/1991 | Chou et al. |

(List continued on next page.)

FOREIGN PATENT DOCUMENTS

| | | |
|---|---|---|
| CN | 1131611 A | 9/1996 |
| CN | 1282750 A | 2/2001 |
| EP | 0632095 | 1/1995 |
| EP | 0 632 095 A2 | 1/1995 |
| EP | 0790275 A1 | 8/1997 |
| EP | 0589033 B1 | 3/1998 |
| EP | 0865909 | 9/1998 |
| EP | 0 865 909 A1 | 9/1998 |
| EP | 0 865 910 A1 | 9/1998 |
| EP | 0 865 911 A1 | 9/1998 |
| EP | 0865911 | 9/1998 |
| EP | 0 865 912 A1 | 9/1998 |
| EP | 0 865 913 A1 | 9/1998 |
| EP | 0 865 914 A1 | 9/1998 |
| EP | 0887375 A1 | 12/1998 |
| EP | 0967671 A2 | 12/1999 |
| EP | 0492942 B1 | 2/2000 |
| EP | 0790262 B1 | 5/2000 |
| EP | 0557721 B1 | 10/2000 |
| EP | 0682066 B2 | 1/2002 |
| EP | 1167404 A1 | 1/2002 |
| JP | 05-255551 A | 10/1993 |
| JP | 07-148837 A | 6/1995 |
| JP | 08-67760 A | 3/1996 |
| JP | 09-176352 A | 7/1997 |
| JP | 09-194650 A | 7/1997 |
| WO | WO 97/10300 | 3/1997 |
| WO | WO 97/11115 | 3/1997 |
| WO | WO 97/22470 | 6/1997 |
| WO | WO 01/98372 | 12/2001 |
| WO | WO 01/98409 | 12/2001 |
| ZA | 970523 | 1/1997 |

OTHER PUBLICATIONS

A. Galeski, "Nucleation". Polypropylene: An A–Z Reference, Kluwer Publishers, 1999 (545–560).*

F. Möller, Houben–Weyl, vol. 11/1 (1957), pp. 277–280.

Primary Examiner—D. Lawrence Tarazano
(74) Attorney, Agent, or Firm—Rick F. James

(57) ABSTRACT

A thermoplastic film containing a core layer and an enhanced printing skin layer. The core layer comprises an orientation enhancing polymer, a polypropylene homopolymer, and a beta-crystal nucleators of polypropylene. The thermoplastic film may be used to enhance printing and where breathable films with good water vapor transmission are desired.

26 Claims, No Drawings

U.S. PATENT DOCUMENTS

| | | | |
|---|---|---|---|
| 5,126,197 A | 6/1992 | Schinkel et al. |
| 5,128,205 A | 7/1992 | Butler |
| 5,134,174 A | 7/1992 | Xu et al. |
| 5,151,309 A | 9/1992 | Dollinger |
| 5,169,712 A | 12/1992 | Tapp |
| 5,176,953 A | 1/1993 | Jacoby |
| 5,194,324 A | 3/1993 | Poirier |
| 5,209,972 A | 5/1993 | Super et al. |
| 5,230,963 A | 7/1993 | Knoerzer |
| 5,231,126 A | 7/1993 | Shi et al. |
| 5,236,963 A | 8/1993 | Jacoby et al. |
| 5,254,631 A | 10/1993 | Yamamoto et al. |
| 5,296,530 A | 3/1994 | Bors et al. |
| 5,310,584 A * | 5/1994 | Jacoby et al. ............... 428/2 |
| 5,317,035 A | 5/1994 | Jacoby |
| 5,380,587 A | 1/1995 | Musclow et al. |
| 5,382,473 A | 1/1995 | Musclow et al. |
| 5,407,751 A | 4/1995 | Genske et al. |
| 5,468,440 A | 11/1995 | McAlpin et al. |
| 5,491,188 A | 2/1996 | Ikeda et al. |
| 5,498,659 A | 3/1996 | Esser |
| 5,516,475 A | 5/1996 | Wilson |
| 5,521,266 A | 5/1996 | Lau |
| 5,525,662 A | 6/1996 | Lavoie et al. |
| 5,529,834 A | 6/1996 | Tsai et al. |
| 5,547,764 A | 8/1996 | Blais et al. |
| 5,585,193 A | 12/1996 | Josephy et al. |
| 5,591,530 A | 1/1997 | Warner et al. |
| 5,594,070 A | 1/1997 | Jacoby et al. |
| 5,617,707 A | 4/1997 | Simmons |
| 5,627,226 A | 5/1997 | Lustiger et al. |
| 5,662,985 A | 9/1997 | Jensen et al. |
| 5,667,902 A | 9/1997 | Brew et al. |
| 5,681,922 A | 10/1997 | Wolfschwenger et al. |
| 5,716,715 A | 2/1998 | Degrassi et al. |
| 5,716,998 A | 2/1998 | Munakata et al. |
| 5,725,962 A | 3/1998 | Bader et al. |
| 5,733,615 A | 3/1998 | Rackovan et al. |
| 5,753,363 A | 5/1998 | Bader et al. |
| 5,789,123 A | 8/1998 | Cleckner et al. |
| 5,811,121 A | 9/1998 | Wu et al. |
| 5,858,552 A | 1/1999 | Bader et al. |
| 5,885,721 A | 3/1999 | Su et al. |
| 5,891,555 A | 4/1999 | O'Brien |
| 5,895,694 A | 4/1999 | Zavadsky et al. |
| 5,919,547 A | 7/1999 | Kocher et al. |
| 5,972,496 A | 10/1999 | Bader et al. |
| 6,004,682 A | 12/1999 | Rackovan et al. |
| 6,005,034 A | 12/1999 | Hayashida et al. |
| 6,025,059 A | 2/2000 | McGee et al. |
| 6,033,758 A | 3/2000 | Kocher et al. |
| 6,072,005 A | 6/2000 | Kobylivker et al. |
| 6,177,144 B1 | 1/2001 | Kranig et al. |
| 6,183,856 B1 | 2/2001 | Amon |
| 6,194,060 B1 | 2/2001 | Amon et al. |
| 6,218,013 B1 | 4/2001 | Wood et al. |
| 6,231,975 B1 | 5/2001 | Kong et al. |
| 6,235,823 B1 | 5/2001 | Ikeda et al. |
| 6,248,442 B1 | 6/2001 | Kong et al. |
| 6,268,062 B1 | 7/2001 | DeMeuse |
| 6,287,700 B1 | 9/2001 | Kong et al. |
| 6,297,328 B1 | 10/2001 | Collins et al. |
| 6,303,233 B1 | 10/2001 | Amon et al. |
| 6,306,518 B1 * | 10/2001 | Shah et al. ............... 428/516 |
| 6,316,067 B1 | 11/2001 | Edwards et al. |
| 6,514,625 B1 * | 2/2003 | DeMeuse ............... 428/516 |
| 6,607,834 B2 * | 8/2003 | Davis et al. ............... 428/457 |
| 6,632,885 B2 * | 10/2003 | Morizono et al. ......... 525/191 |
| 2002/0146551 A1 * | 10/2002 | Freedman et al. ......... 428/220 |
| 2002/0187361 A1 * | 12/2002 | Amon ............... 428/516 |
| 2002/0197463 A1 * | 12/2002 | Davidson et al. ........... 428/220 |
| 2003/0207137 A1 * | 11/2003 | Kong et al. ............... 428/515 |
| 2003/0207138 A1 * | 11/2003 | Kong et al. ............... 428/515 |

\* cited by examiner

THERMOPLASTIC FILM

This Application is a "continuation-in-part" application of application Ser. No.: 10/135,321, filed May 1, 2002.

BACKGROUND OF THE INVENTION

The present invention relates to a thermoplastic film containing a core layer and an enhanced printing skin layer. The core layer comprises an orientation-enhancing polymer, a polypropylene homopolymer, a beta-crystal nucleators of polypropylene, and optionally a water absorption additive. The thermoplastic film is an oriented film and may be opaque.

Water based ink printing on standard thermoplastic polypropylene film requires a long time to dry. This is a particular problem when standard thermoplastic polypropylene films are used with ink-jet printing. Additionally, for good adhesion when using films with water-based pressure sensitive adhesives or with cold glues, good drying and adhesion properties are desired. Further, breathable films with good water vapor transmission are desired for bags, absorbent articles and garments.

Park et al, U.S. Pat. No. 4,632,869, discloses an opaque, biaxially oriented film structure having a polymer matrix with strata of cavitated voids, in which the voids contain spherical void-initiating particles of polybutylene terephthalate (PBT). The structure may also include thermoplastic skin layers, and the film can also include pigments such as $TiO_2$ or colored oxides.

Park et al, U.S. Pat. No. 4,758,462, discloses an opaque, biaxially oriented film with a cavitated core layer and transparent skin layers. Colored light absorbing pigments such as carbon black or iron oxide are added to the core and/or the skins to decrease light transmission through the film.

Crass et al, U.S. Pat. No. 4,652,489 discloses an oriented, sealable, opaque polyolefin multi-layer film with a core layer containing vacuoles or voids, a sealable surface layer, and a non-sealable surface layer which incorporates a slip agent such as a polydiorganosiloxane.

Amon et al, U.S. Pat. No. 6,194,060, discloses an opaque, oriented polymeric film structure, suitable for food packaging, comprising: (a) a core layer containing a thermoplastic polymeric matrix material which has a first surface and a second surface, the core layer having a plurality of voids, substantially all or all of the voids being free from a void-initiating particle and at least some of the voids being interconnected with an adjacent void in the polymeric matrix material, the number of voids not containing a void-initiating particle being sufficient to impart a significant degree of opacity to the film structure; and (b) at least one outer or skin layer containing a thermoplastic polymeric material and an effective amount of a nucleating agent to suppress cavitation in said at least one outer or skin layer. The film structure is stated to have a smooth surface and to be tailorable to provide a controlled permeability.

Amon et al, U.S. Pat. No. 6,303,233, discloses a uniaxially heat-shrinkable, biaxially oriented, multilayer film having a polypropylene-containing core layer containing at least 70 wt. % of the multilayer film and at least one polyolefin-containing skin layer adjacent the core layer, which is prepared by biaxially orienting a coextrudate and thereafter orienting the coextrudate by stretching 10 to 40% in the machine direction. The core layer contains isotactic polypropylene, a modifier which reduces the crystallinity of the polypropylene-containing core layer and a nucleating agent. The modifiers include atactic polypropylene, syndiotactic polypropylene, ethylene-propylene copolymer, propylene-butene-1 copolymer, ethylene-propylene-butene-1 terpolymer, and linear low density polyethylene. The nucleating agent is said to improve long term dimensional stability. The skin layer can be high density polyethylene on both sides or high density polyethylene on one side and isotactic polypropylene on the other side.

Amon, U.S. Pat. No. 6,183,856, discloses a process for forming film structures which have a plurality of voids, at least some of the voids not containing a void-initiating particle and at least some of the voids being interconnected with an adjacent void in the polymeric matrix material, with the number of voids being sufficient to impart a significant degree of opacity in the film structure.

Davidson et al, EP0865909, discloses biaxially oriented heat shrinkable polyolefin films for use as labels, having a layer of a polypropylene-based resin with microvoids therein. The microvoids having been formed by stretching a web containing the beta form of polypropylene.

Davidson et al, EP0865910, and Davidson et al, EP0865912, disclose biaxially oriented polyolefin opaque films having a thickness of not more than 50 $\mu$m having a layer of a polypropylene-based resin with microvoids therein. The microvoids having been formed by stretching a web containing the beta form of polypropylene at an area stretch ration of at least 15:1.

Davidson et al, EP0865911, discloses biaxially oriented polyolefin films, including microvoids formed by stretching polypropylene based resin which contains the beta form of polypropylene, and a heat seal layer. The heat seal becomes transparent upon heating.

Davidson et al, EP0865913, discloses biaxially oriented heat shrinkable polyolefin films having a layer of a polypropylene-based resin with microvoids therein. The microvoids having been formed by stretching a web containing the beta form of polypropylene, the film having a shrinkage after 10 minutes at 130° C. of at least 10% in at least one direction.

Davidson et al, EP0865914, discloses biaxially oriented high gloss polyolefin films having a layer of a polypropylene-based resin with microvoids therein and at least one olefin copolymer outer layer thereon. The microvoids having been formed by stretching a web containing the beta form of polypropylene.

Jacoby et al, U.S. Pat. No. 5,594,070 discloses oriented microporous films prepared from polyolefin resin compositions comprising an ethylene-propylene block copolymer having an ethylene content of about 10 to about 50 wt. %, a propylene homopolymer or random propylene copolymer having up to about 10 wt. % of a comonomer of ethylene or an $\alpha$-olefin of 4 to 8 carbon atoms, and components selected from a low molecular weight polypropylene, a beta-spherulite nucleating agent and an inorganic filler. The microporous films are said to have improved breathability, strength, toughness and break elongation. However, the films of Jacoby have a tendency to exhibit pink color when red dye (beta-spherulite nucleating agent) concentration is higher than 50 ppm. If the concentration of red dye (beta-spherulite nucleating agent) is lower than 50 ppm, then it is difficult to obtain consistent opacity due to poor dispersion uniformity.

Jacoby et al, U.S. Pat. No. 5,310,584, discloses a thermoformable sheet comprising a resinous polymer of propylene and an effective amount of a beta-spherulite nucleating agent, a process for making the sheet and articles thermoformed from the sheet.

Xu et al, U.S. Pat. No. 5,134,174, discloses polypropylene microporous films having a porosity of 30–35%, an average pore size of 200–800 Å, a permeation coefficient for nitrogen of $1–5 \times 10^{-3}$ ml/cm sec atm and a tensile strength of greater than 60 MPA in all directions within the film plane. The films are prepared by the consecutive steps of biaxial stretching a non-porous starting film of high beta-crystal content and heat setting the stretched film.

Kobylivker et al, U.S. Pat. No. 6,072,005 discloses a breathable film, having certain physical and barrier properties, made from a stretched impact modified polyolefin matrix and a particulate filler. The impact modified polyolefin matrix includes at least one impact polypropylene copolymer, alone or in combination with other polymers. The film, and laminates including the film, are stated to provide moisture breathability and barrier to penetration by liquids. Disclosed uses for laminates including the film include diaper outercovers and other applications requiring breathability and resistance to penetration by liquids.

BRIEF SUMMARY OF THE INVENTION

Water based ink printing on standard thermoplastic polypropylene film requires a long time to dry. This is a particular problem when standard thermoplastic polypropylene film are used with ink-jet printing. The film of the present invention provides for superior water absorption and is particularly effective for water-based printing. Further, the film of the present invention shows good drying due to good water vapor permeability when it is used with a water-based pressure sensitive adhesive or with a cold glue as a label. Another advantage is when the film of the present invention is used as a label with a pressure sensitive adhesive, due to the paper tear property, the film of the present invention may be used as evidence of tampering. Thus, the film of the present invention may be used as a tamper evident label, for water-based ink printing applications, for ink-jet printing and as a synthetic paper. In addition to water based inks, the film of the present invention may also be used as a printable surface for solvent based inks and UV-curable inks.

The film may also be used in applications where breathable films are employed and good water vapor transmission are desired. For example as a backsheet component in a personal care absorbent article, such as a diapers, training pants, incontinence garments, feminine hygiene products and the like. The relative humidity and temperature within the diaper or other product can be reduced by using breathable films and laminates. The film may be used as a cover or bag for produce. The film may also be used in surgical gowns, protective workwear, wound dressings and bandages, where an objective is to provide good water vapor transmission and make the item more comfortable to the wearer.

The opaque film of the present invention is different from the conventional opaque polypropylene films. Conventional opaque polypropylene films are cavitated by organic polymers or inorganic fillers.

In the present invention, beta-crystal growth during polypropylene film casting is controlled, followed by orientation, to create the high permeability opaque film.

DETAILED DESCRIPTION OF THE INVENTION

The core layer comprises an orientation-enhancing polymer, a polypropylene homopolymer, a beta crystal nucleator of polypropylene, and optionally a water absorption additive.

Preferably, the orientation-enhancing polymer comprises an (isotactic propylene)-ethylene heterophasic copolymer and at least one polymer selected from the group consisting of an impact polypropylene polymer, an impact polypropylene copolymer, an α-olefin-(isotactic propylene) rubber modified polypropylene, a metallocene isotactic polypropylene, an isotactic polypropylene grafted with elastomer, a maleated-isotactic polypropylene, a blend of an isotactic polypropylene and a syndiotactic polypropylene, a blend of an isotactic polypropylene and an atactic polypropylene, a blend of an isotactic polypropylene and an acrylic elastomer, a blend of an isotactic polypropylene and an alkenic elastomer, a blend of an isotactic polypropylene, a polyethylene, and an ethylene-propylene rubber, a blend of an isotactic polypropylene and a polyisobutylene, a blend of an isotactic polypropylene and a styrenic elastomer, a blend of an isotactic polypropylene and a metallocene isotactic polypropylene copolymer, and a blend of an isotactic polypropylene and an isotactic propylene copolymer, and mixtures thereof. Preferably, the orientation-enhancing polymer is not an ethylene-propylene block copolymer.

The orientation-enhancing polymer assists in making the biaxial tenter frame orientation for the film of this invention. Without the orientation-enhancing polymer, it is difficult to make a reliable biaxial oriented film with only polypropylene loaded with beta-crystal nucleator, due to film split and high mechanical stress in the TD orientation. The addition of orientation-enhancing polymer in the core layer improves the tenter frame orientation stability especially above 4 times orientation in the transverse direction without film split. Further, the opacity of the film may be maintained.

The core layer preferably comprises 1 to 99 wt. % polypropylene and 99 to 1 wt. % orientation-enhancing polymer (based on total polymers) and the beta crystal nucleator for polypropylene. More preferably, the core layer comprises 10 to 90 wt. % polypropylene homopolymer and 90 to 10 wt. % orientation-enhancing polymer (based on total polymers) and the beta crystal nucleator for polypropylene. Most preferably, the core layer comprises 30 to 70 wt. % polypropylene homopolymer and 70 to 30 wt. % orientation-enhancing polymer (based on total polymers) and the beta crystal nucleator for polypropylene.

More preferably, the core layer is made from an impact polypropylene masterbatch with a beta crystal nucleator of polypropylene and a water absorption additive, or the core layer is made from an impact polypropylene masterbatch with a beta crystal nucleator of polypropylene, an isotactic polypropylene, and a water absorption additive. The core layer may also be made from: An (isotactic propylene)-ethylene heterophasic copolymer masterbatch with a beta crystal nucleator of polypropylene and an isotactic polypropylene; An impact polypropylene masterbatch with a beta crystal nucleator of polypropylene and a metallocene isotactic polypropylene; An (isotactic propylene)-ethylene heterophasic copolymer, ethylene-propylene-ethylidene norbornene elastomer, isotactic polypropylene masterbatch with a beta crystal nucleator of polypropylene and an isotactic polypropylene that has a different m-pentad than the isotactic polypropylene in the isotactic polypropylene masterbatch; or An (isotactic propylene)-ethylene heterophasic copolymer, ethylene-propylene rubber, polyethylene, isotactic polypropylene with a beta crystal nucleator of polypropylene, and an isotactic polypropylene that has a different m-pentad than the isotactic polypropylene in isotactic propylene masterbatch.

The water absorption additive may be an inorganic fillers such as $CaCO_3$, $BaCO_3$, talc, clay, silica, and hygroscopic polymers such as polyethylene oxide, nonylphenol polyethylene glycol ether, polyvinyl alcohol, atactic and syndiotactic salts of polyacrylic acid, a methacrylic acid copolymer and its salts. More than one water absorption additive may be used together.

The orientation-enhancing polymer may be a blend comprising alpha-olefin-propylene elastomer and (isotactic propylene)-ethylene heterophasic copolymer. The (isotactic propylene)-ethylene heterophasic copolymer is generally produced by two reactors. The isotactic propylene homopolymer matrix is made with 60 to 95% by weight based on the weight of the whole final polymer in the first reactor, and then transferred to the second reactor where ethylene and propylene are polymerized to create ethylene-propylene elastomer about 5 to 40% by weight based on the weight of the whole final polymer, dispersed in the homopolymer phase. The alpha-olefin-propylene elastomer comprises ethylene-propylene elastomer, butylene-propylene elastomer, pentene-propylene elastomer, hexene-propylene elastomer, octene-propylene elastomer, ethylene-propylene-ethylidene norbornene elastomer and ethylene-propylene-vinyl norbornene elastomer.

Preferably, the polypropylene homopolymer is an isotactic polypropylene. The isotactic polypropylene preferably has an m-pentad greater than 85% by NMR spectroscopy measurement. A mixture of isotactic polypropylenes may be used, preferably, the mixture comprises at least two polypropylene polymers having different m-pentads by NMR spectroscopy measurement. Preferably, the difference between m-pentads is at least 1%.

Polypropylene is capable of crystallizing in several crystal forms. The alpha or monoclinic form of polypropylene is the most stable and prevalent form. Without control, the beta or hexagonal form may be found in commercially available polypropylene, but usually at low levels. The beta-form of polypropylene may be produced more effectively by using a beta nucleating agent. As beta crystal nucleators of polypropylene, any know types of beta nucleators may be used.

Jacoby, U.S. Pat. No. 4,386,129, and Jacoby, U.S. Pat. No. 4,975,469, disclose a process of forming a film containing nucleating agents to produce beta-form spherulites and then selectively extracting the beta-spherulites. Both Jacoby patents disclose quinacridone compounds, bisodium salts of o-phthalic acids, aluminum salts of 6-quinizarin sulfonic acid and isophthalic and terephthalic acids as beta nucleating agents.

Wolfschwenger et al, U.S. Pat. No. 5,681,922, discloses the use of dicarboxylic acid salts of metals of the second main group of the Periodic Table as beta nucleating agents.

A two component beta nucleators may be used. For example, Shi et al, U.S. Pat. No. 5,231,126, discloses the use of a mixture of a dibasic organic acid and an oxide, hydroxide or salt of a metal of group IIA of the Periodic Table.

Ikeda et al, U.S. Pat. No. 5,491,188, Ikeda et al, U.S. Pat. No. 6,235,823, and Ikeda et al, EP 0632095, discloses the use of certain types of amide compounds as beta nucleators.

Hayashida et al, U.S. Pat. No. 6,005,034, discloses various types of beta nucleators.

Jacoby, U.S. Pat. No. 4,386,129, Jacoby, U.S. Pat. No. 4,975,469, Wolfschwenger et al, U.S. Pat. No. 5,681,922, Shi et al, U.S. Pat. No. 5,231,126, Ikeda et al, U.S. Pat. No. 5,491,188, Ikeda et al, U.S. Pat. No. 6,235,823, Ikeda et al, EP 0632095, and Hayashida et al, U.S. Pat. No. 6,005,034, are herein incorporated by reference.

The beta-nucleating agent is preferably a two component beta nucleator formed by the mixing of Components A and B. Component A is an organic dibasic acid, such as pimelic acid, azelaic acid, o-phthalic acid, terephthalic and isophthalic acid and the like. Component B is an oxide, hydroxide or an acid salt of a Group II metal e.g. magnesium, calcium, strontium and barium. The acid salt of Component B may come from inorganic or organic acid such as carbonate, stearate etc. Component B may also be one of the additives of polypropylene, that already is present in the polypropylene material.

The proportion of component A is in the range of 0.0001–5% by weight, most preferably 0.01–1 wt %, the proportion of component B is 0.0001–5% by weight, most preferably 0.05–1%, during mixing.

Preferably, the beta crystal nucleator of polypropylene is not a red dye.

Preferably, the beta nucleators are incorporated into the resinous polymer before the film is formed. More preferably, the beta nucleators are combined with the impact polypropylene polymer or the polypropylene homopolymer in the form of a master batch before the sheet is formed.

The amount of beta nucleators used should be enough to obtain the desired degree of void formation upon stretching. The amount of beta nucleators may also be used to control the degree of opacity. Preferred amounts of beta nucleators are from 0.0002 to 8 wt. % based on the weight of polypropylene, more preferably 0.005 to 2 wt. %, and 0.01 to 2 wt. %.

The printable skin layer of the present invention can be in direct contact with the core layer or may be on at least one intermediate layer.

The printable skin layer may be of any thickness. Preferably, the printable skin layer has thickness of 1.25 μm or greater, more preferably, a thickness of 2.5 μm or greater, most preferably, a thickness of 3.75 μm or greater.

Preferably the printable skin layer comprises an impact polypropylene copolymer and a beta crystal nucleator of polypropylene. Optionally, water absorption additives may be included in the printable skin layer.

In a preferred embodiment, the printable skin layer comprises a polypropylene homopolymer, an orientation-enhancing polymer, a beta crystal nucleator of polypropylene, and a water absorption additive, and the printable skin layer is surface treated by any known method, such as corona flame or plasma.

The intermediate layer, when present, may be made of any type of compatible material and have any thickness. Separate from the intermediate layer between the core layer and the printable skin layer, the film may also contain one or more other intermediate layers. For example, the film may contain an intermediate layer between the core layer and an outer layer. Preferably, the intermediate layer comprises a polypropylene homopolymer, an orientation-enhancing polymer, a beta crystal nucleator of polypropylene, a water absorption additive, and inorganic particles. In a preferable embodiment, the composition of the intermediate layer is the same as that of the core layer.

The intermediate layer may be of any thickness. Preferably, the intermediate layer has a thickness greater than 2.5 μm. More preferably, the intermediate layer has thickness greater than the thickness of the printable skin layer.

In a preferable embodiment, the total weight percentage of the water absorption additive of the intermediate layer is greater than the total weight percentage of the water absorption additive of the printable skin layer.

Any water absorption additive may be used as the water absorption additive. Preferably, the water absorption additive is at least one selected from the group consisting of an inorganic additive, for example, $CaCO_3$, $BaCO_3$, clay, talc, and silica, and a hygroscopic polymer. The percentage of inorganic additive can be from 5 wt % to 30 wt %, preferably from 10 wt % to 20 wt %, more preferably 12 wt % to 18 wt %. The percentage of organic hygroscopic polymer can be from 1 wt % to 10 wt %, preferably from 1 wt % to 6 wt %, more preferably 2 wt % to 4 wt %.

In a separate preferable embodiment, the side of the core layer opposite to the printable skin layer may contain an outer skin layer.

The outer skin layer preferably comprises at least one polymer selected from the group consisting of an impact polypropylene polymer, a polypropylene homopolymer, a polypropylene copolymer, such as propylene-ethylene copolymer, a metallocene polypropylene, a syndiotactic polypropylene, blend of an isotactic polypropylene and a syndiotactic polypropylene, blend of an isotactic polypropylene and an atactic propylene, a metallocene isotactic propylene copolymer and an (isotactic propylene)-ethylene heterophasic copolymer. The outer skin layer may optionally contain a beta crystal nucleator of polypropylene.

The outer skin layer may be the same blend as the core layer or may comprise a different blend of components. Preferably, the outer skin layer comprises an (isotactic propylene)-ethylene heterophasic copolymer and a beta crystal nucleator of polypropylene or the outer skin layer is made from an impact polypropylene masterbatch with a beta crystal nucleator of polypropylene.

The outer skin layer may also be surface treated by any known method, such as by corona, flame or plasma, to be a printable layer. The outer skin layer may also be used as the coating adhesive, or other surface coating.

As discussed above, the film of the present invention may be a two layer film (a core layer (B) and a printable skin layer (C)) ("B/C") or a three layer film (a core layer (B), a printable skin layer (C) and an outer skin layer (A)) ("A/B/C"). The film of the present invention may also contain one or more intermediate layers (I). The film of the present invention may comprise four layers, five layers or more. For example, the film of the present invention may include multiple core layers, multiple printable skin layers and multiple outer skin layers and other types of layers. Such as A/B/B/C, A/I/B/I/C and A/B/I/C layer arrangements.

One preferable embodiment is a five-layer arrangement containing an intermediate layer between the core layer and the printable skin layer and an intermediate layer between the core layer and the outer layer.

The film may be uniaxially oriented at from 3 to 10 times of orientation ratio. The film may be biaxially oriented from 3 to 6 times of orientation ratio in the machine direction (MD) and 4 to 10 times of orientation ratio in the transverse direction (TD). The MD and TD orientations may be performed sequentially or simultaneously by the tenter frame orientation method.

The film may be made by any known method, preferably by coextrusion of the layers.

The film layers in accordance with the present invention can include one or more additives used in the film art. For example, fillers (organic or inorganic), pigments, stabilizers, UV absorbers, slip agents, antistatic agents, antiblock agents, and etc.

The inorganic fillers may be located in the core layer or in the intermediate layers when present, such as in a five layer film. The inorganic fillers preferably are at least one of $CaCO_3$, $BaCO_3$, clay, talc, silica, mica and $TiO_2$. The organic fillers may be preferably located in the core layer. The organic fillers preferably are at least one of a polybutylene terephthalate, a polyamide, a polyethylene terephthalate, a cyclic olefin copolymer, a polystyrene, and a syndiotactic polystyrene.

Preferably the water vapor transmission rate (WVTR) of the film, as measured by ASTM F1249, is greater than 4.0 $g/m^2/day$. More preferably, the WVTR is at least 15 $g/m^2/day$.

Preferably the light transmission of the film, as measured by ASTM D1003, is less than 35%. More preferably, the light transmission is less than 30%.

Total film thickness of the enhanced printing film is from 20 $\mu$m to 30 $\mu$m. Preferably, the film thickness is greater than 30 $\mu$m.

The present invention will be further described with reference to the following non-limiting examples. It is to be understood that the invention is not limited in its application to the details of construction and the arrangements of components set forth in the following description.

EXAMPLE 1

A three-layer oriented opaque film, A/B/C, is made via tenter-frame sequential orientation at 4 times in MD orientation and 8 times in TD orientation. The A-layer about 2.5 $\mu$m poly-gauge thickness comprises polypropylene impact copolymer and beta-nucleators of polypropylene. The B-layer about 30 $\mu$m poly-gauge thickness comprises 60wt % of polypropylene, FINA3371 from Fina Oil Company, 40 wt % of impact polypropylene copolymer with beta crystal nucleator of polypropylene, ARISTECH BI4020TSP from Sunoco Chemicals. The C-layer is the same as A-layer. The film has light transmission about 10.6% and WVTR about 127 $g/m^2/day$. The A-layer surface is treated with corona. An ink-jet printing with Canon S600 printer was applied on the A-layer surface. Good ink drying was observed for red, blue, yellow, and green colors. The C-layer was coated with cold glue adhesive. The label was applied on the bottle. A paper tear was observed when the label was removed from the bottle.

The ink drying test was conducted by, thirty minutes after printing, covering the printed surface with a plain paper. Good ink drying occurred when there was no ink transferred to the plain paper.

EXAMPLE 2

A three-layer oriented opaque film, A/B/C, is made via tenter-frame sequential orientation at 4 times in MD orientation and 8 times in TD orientation. The A-layer about 3.75 $\mu$m comprises 70 wt % of impact polypropylene copolymer with beta-nucleators of polypropylene, Aristech BI4020TSP and 30 wt % of HDPE with $CaCO_3$ masterbatch T4228 from A. Schulman (50% $CaCO_3$ and 50% HDPE). The B-layer about 30 $\mu$m comprises 60 wt % polypropylene with beta-nucleators and 40 wt % (isotactic propylene)-ethylene heterophasic copolymer, Basell 8523 from Basell. The C-layer about 2.5 $\mu$m comprises impact polypropylene copolymer with beta-nucleators, Aristech BI4020TSP. The film has light transmission about 10.7%. The A-layer is treated with corona. An ink-jet printing was applied on the A-layer surface. Good ink drying was observed for red, blue, yellow, green and black colors.

EXAMPLE 3

A five-layer oriented opaque film, P/Q/R/S/T, is made by tenter-frame sequential orientation at 4 times in MD orientation and 8 times in TD orientation. The P-layer about 1.25 μm comprises 70 wt % of impact polypropylene copolymer masterbatch with beta-crystal nucleator of polypropylene, BI4020SP from Sunoco Chemicals, and 30 wt % of HDPE masterbatch with $CaCO_3$, T4228 from A. Schulman (50% $CaCO_3$ and 50% HDPE). The Q-layer about 5 μm comprises 65 wt % of impact polypropylene copolymer masterbatch with beta-crystal nucleator of polypropylene, BI4020SP from Sunoco Chemicals, and 35 wt % of HDPE masterbatch with $CaCO_3$, T4228 from A. Schulman (50% $CaCO_3$ and 50% HDPE). The core layer, R-layer, about 25 μm comprises 60 wt % of isotactic polypropylene masterbatch with beta-crystal nucleator of polypropylene, BEPOL 022SP from Sunoco Chemicals, and 40 wt % of (isotactic propylene)-ethylene heterophasic copolymer, BASELL 8523 from Basell Company. The S-layer about 2.5 μm has the same composition as the core layer. The T-layer about 2.5 μm comprises impact polypropylene copolymer with beta crystal nucleator of polypropylene, BI4020SP from Sunoco Chemicals. The film has light transmission about 10.2%. The P-layer is treated with corona. Ink-jet printing is applied on the P-layer surface. Good ink drying is observed for red, blue, yellow, green, and black colors.

EXAMPLE 4

A five-layer oriented opaque film, P/Q/R/S/T, is made by tenter-frame sequential orientation at 4 times in MD orientation and 8 times in TD orientation. The P-layer about 1.25 μm comprises 70 wt % of impact polypropylene copolymer masterbatch with beta-crystal nucleator of polypropylene, BI4020SP from Sunoco Chemicals, and 30 wt % of polypropylene masterbatch with $CaCO_3$, T39600 from A. Schulman (50% $CaCO_3$ and 50% polypropylene). The Q-layer about 5 μm comprises 68.6 wt % of impact polypropylene copolymer masterbatch with beta-crystal nucleator of polypropylene, BI4020SP from Sunoco Chemicals, 30 wt % of polypropylene masterbatch with $CaCO_3$, T39600 from A. Schulman (50% $CaCO_3$ and 50% polypropylene), and 1.4 wt % of hygroscopic polymer, POLYOX WSR N-80 from Union Carbide. The core layer, R-layer, about 25 μm comprises 60 wt % of polypropylene masterbatch with beta-crystal nucleator of polypropylene, and 40 wt % of (isotactic propylene)-ethylene heterophasic copolymer, BASELL 8523 from Basell Company. The S-layer about 2.5 μm has the same structure as the core layer. The T-layer about 2.5 μm has impact polypropylene copolymer masterbatch with beta-crystal nucleator of polypropylene, BI4020SP from Sunoco Chemicals. The film has light transmission about 8.4%. The P-layer is treated with corona. An ink-jet printing is applied on the P-layer surface. Good ink drying is observed for red, blue, yellow, green, and black colors.

EXAMPLE 5

A three-layer oriented opaque film, A/B/C, is made by tenter-frame sequential orientation at 4 times in MD orientation and 8 times in TD orientation. The A-layer about 3.75 μm comprises 58.5 wt % of isotactic polypropylene, PP4612 from ExxonMobil Chemicals, 300 ppm of beta-crystal nucleator of polypropylene, NJ STAR NU-100 from New Japan Chemicals, 27 wt % of polypropylene masterbatch with $CaCO_3$, T39600 from A. Schulman (50% $CaCO_3$ and 50% polypropylene), 10 wt % of impact polypropylene copolymer, PP7623E1 from ExxonMobil Chemicals, and 4.5 wt % of hygroscopic polymer POLYVEL S-1180. The B-layer about 32.5 μm comprises 60 wt % of polypropylene, PP4612 from ExxonMobil Chemicals, and 40 wt % of impact polypropylene copolymer with beta crystal nucleator for polypropylene, BI4020SP from Sunoco Chemicals. The C-layer about 1.25 μm is propylene-ethylene-butene-1 terpolymer, Chisso7510 from Chisso Chemicals, Japan. The film has light transmission about 7.9%. The A-layer is treated with corona. An ink-jet printing is applied on the A-layer surface. Good ink drying is observed for red, blue, yellow, green and black colors.

Aside from the preferred embodiments and specific examples presented, the present invention is capable of other embodiments and of being practiced or being carried out in various ways.

The parent application, Ser. No.: 10/135,321, filed May 1, 2002, is herein incorporated by reference.

What is claimed is:

1. A thermoplastic film, comprising a core layer and at least one printable skin layer, wherein said core layer comprises an orientation-enhancing polymer, a polypropylene homopolymer, at least one beta crystal nucleator of polypropylene and optionally a water absorption additive.

2. The thermoplastic film of claim 1, wherein said orientation-enhancing polymer comprises an (isotactic propylene)-ethylene heterophasic copolymer and at least one polymer selected from the group consisting of:
   an impact polypropylene polymer;
   an impact polypropylene copolymer;
   an α-olefin-(isotactic propylene) rubber;
   a metallocene-catalyzed isotactic polypropylene;
   an isotactic polypropylene grafted with elastomer;
   a maleated-isotactic polypropylene;
   a blend of an isotactic polypropylene and a syndiotactic polypropylene;
   a blend of an isotactic polypropylene and an atactic polypropylene;
   a blend of an isotactic polypropylene and an acrylic elastomer;
   a blend of an isotactic polypropylene and an alkenic elastomer;
   a blend of an isotactic polypropylene, a polyethylene, and an ethylene-propylene rubber;
   a blend of an isotactic polypropylene and a polyisobutylene;
   a blend of an isotactic polypropylene and a styrenic elastomer;
   a blend of an isotactic polypropylene and a metallocene-catalyzed isotactic polypropylene copolymer; and
   a blend of an isotactic polypropylene and an isotactic propylene copolymer.

3. The thermoplastic film of claim 1, wherein said printable skin layer comprises an impact polypropylene copolymer and a beta crystal nucleator of polypropylene.

4. The thermoplastic film of claim 1, wherein said printable skin layer comprises a polypropylene homopolymer, an orientation-enhancing polymer, a beta crystal nucleator of polypropylene, and a water absorption additive.

5. The thermoplastic film of claim 4, wherein said water absorption additive of the printable skin layer is at least one selected from the group consisting of $CaCO_3$, $BaCO_3$, clay, talc, silica, and a hygroscopic polymer.

6. The thermoplastic film of claim 5, wherein said water absorption additive is a hygroscopic polymer selected from the group consisting of polyethylene oxide, nonylphenol polyethylene glycol ether, polyvinyl alcohol, atactic salts of polyacrylic acid, syndiotactic salts of polyacrylic acid, and methacrylic acid copolymer and its salts.

7. The thermoplastic film of claim 1, further comprising an intermediate layer, located between the core layer and said printable skin layer.

8. The thermoplastic film of claim 7, wherein said intermediate layer comprises a polypropylene homopolymer, an orientation-enhancing polymer, a beta crystal nucleator of polypropylene and a water absorption additive.

9. The thermoplastic film of claim 8, wherein the total weight percentage of the water absorption additives of said the intermediate layer is greater than the total weight percentage of the water absorption additives of the printable skin layer.

10. The thermoplastic film of claim 7, wherein said intermediate layer has thickness greater than the thickness of said printable skin layer.

11. The thermoplastic film of claim 1, wherein said polypropylene homopolymer is an isotactic polypropylene.

12. The thermoplastic film of claim 11, wherein said isotactic polypropylene has m-pentad greater than 85% by NMR spectroscopy measurement.

13. The thermoplastic film of claim 1, wherein said printable skin layer surface is treated with corona, flame, or plasma.

14. The thermoplastic film of claim 13, further comprising an ink-jet print on said printable skin layer.

15. The thermoplastic film of claim 1, wherein said printable skin layer is an ink-jet printable surface, a water-based ink printable surface, a solvent-based ink printable surface, or a UV-curable ink printable surface.

16. The thermoplastic film of claim 1, further comprising an outer skin layer comprising a water based pressure sensitive adhesive located on the side of said film opposite to said printable skin layer.

17. The thermoplastic film of claim 1, further comprising a cold glue layer located on the side of said film opposite to said printable skin layer.

18. The thermoplastic film of claim 1, wherein said beta crystal nucleator of polypropylene comprises a mixture of an organic dibasic acid and an oxide, a hydroxide, or an acid salt of a Group II metal.

19. The thermoplastic film of claim 1, further comprising an outer skin layer which has a composition which is the same as the core layer.

20. The thermoplastic film of claim 11, wherein said isotactic polypropylene comprises a mixture of at least two polypropylene polymers having different m-pentads by NMR spectroscopy measurement.

21. The thermoplastic film of claim 1, wherein said core layers contains at least one water absorption additive selected from the group consisting of $CaCO_3$, $BaCO_3$, clay, talc, silica, and a hygroscopic polymer.

22. A thermoplastic film, comprising a core layer and at least one printable skin layer, wherein said core layer comprises an orientation-enhancing polymer, a polypropylene homopolymer, at least one beta crystal nucleator of polypropylene and optionally a water absorption additive, wherein said printable skin layer comprises a polypropylene homopolymer, an orientation-enhancing polymer, a beta crystal nucleator of polypropylene, and a water absorption additive, and wherein said water absorption additive of said printable skin layer is a hygroscopic polymer selected from the group consisting of polyethylene oxide, nonylphenol polyethylene glycol ether, polyvinyl alcohol, atactic salts of polyacrylic acid, syndiotactic salts of polyacrylic acid, and methacrylic acid copolymer and its salts.

23. A thermoplastic film, comprising a core layer and at least one printable skin layer, wherein said core layer comprises an orientation-enhancing polymer, a polypropylene homopolymer, at least one beta crystal nucleator of polypropylene and optionally a water absorption additive, and wherein said film further comprises an outer skin layer comprising a water based pressure sensitive adhesive located on the side of said film opposite to said printable skin layer.

24. A label, comprising the thermoplastic film of claim 23.

25. A thermoplastic film, comprising a core layer and at least one printable skin layer, wherein said core layer comprises an orientation-enhancing polymer, a polypropylene homopolymer, at least one beta crystal nucleator of polypropylene and optionally a water absorption additive, and wherein said film further comprises a cold glue layer located on the side of said film opposite to said printable skin layer.

26. A label, comprising the thermoplastic film of claim 25.

* * * * *